UNITED STATES PATENT OFFICE.

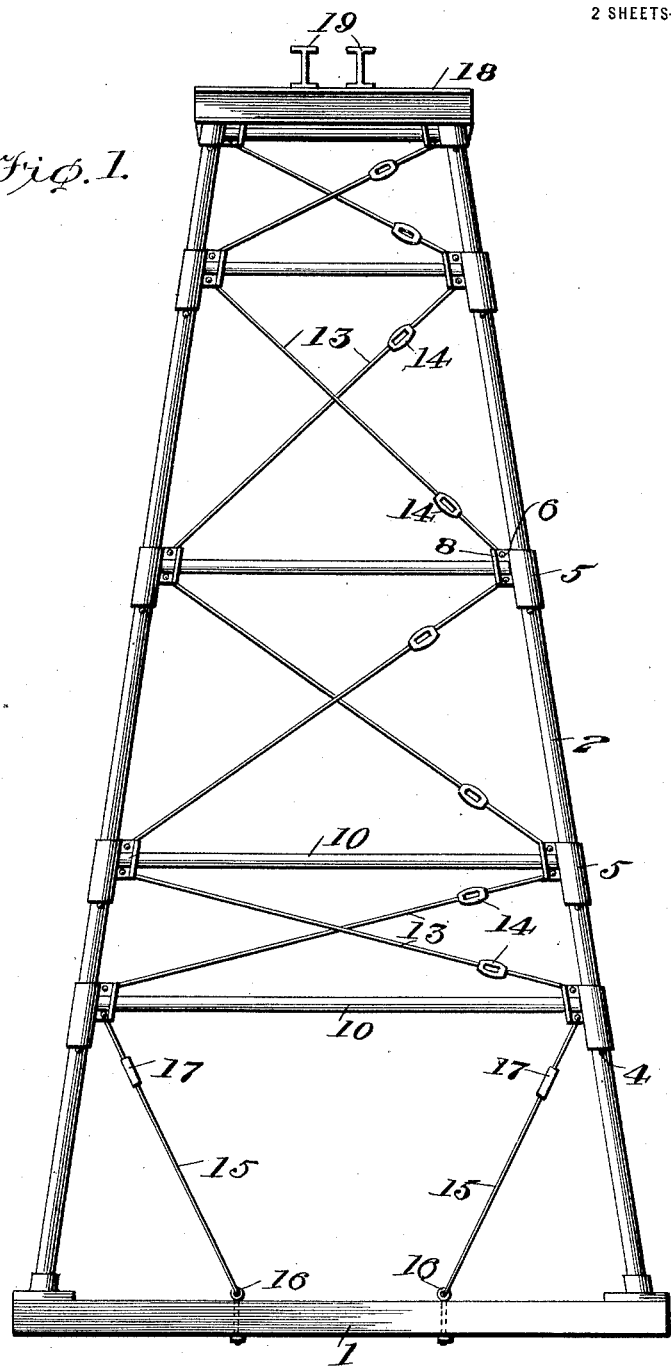

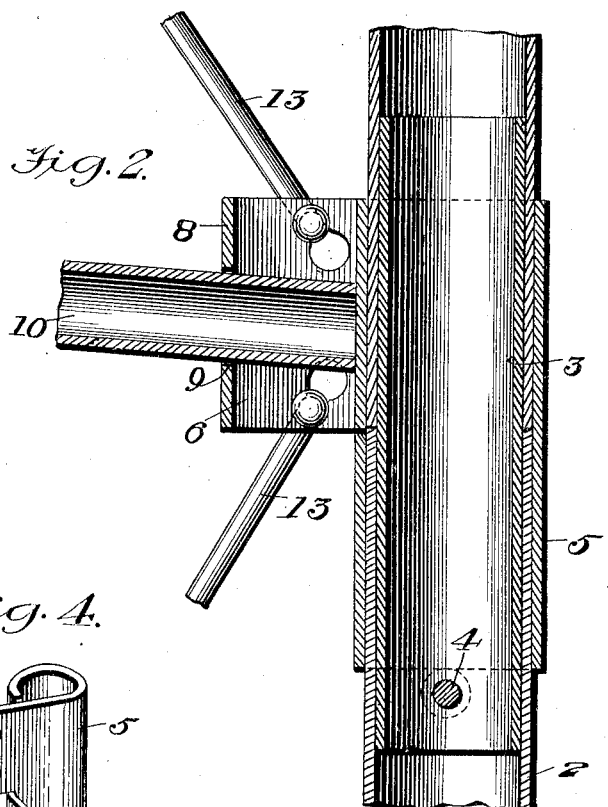
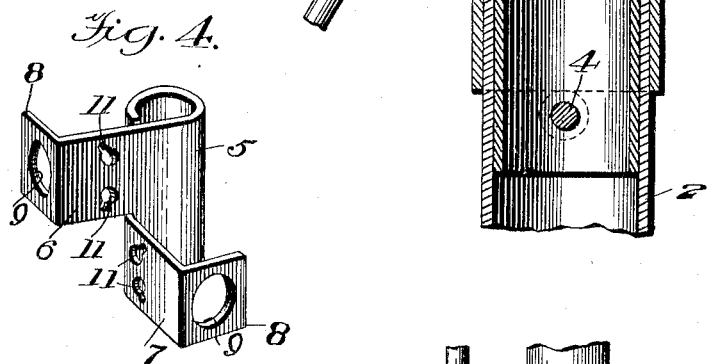
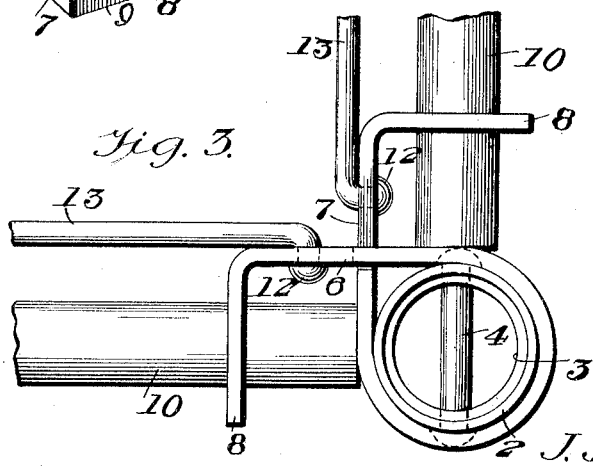

JOHN BENJAMIN HEID, OF TULSA, OKLAHOMA.

TOWER CONSTRUCTION.

1,330,375.  Specification of Letters Patent.  Patented Feb. 10, 1920.

Application filed May 6, 1919. Serial No. 295,146.

*To all whom it may concern:*

Be it known that I, JOHN BENJAMIN HEID, a citizen of the United States, and a resident of Tulsa, in the county of Tulsa and State of Oklahoma, have invented certain new and useful Improvements in Tower Constructions, of which the following is a specification.

My invention is an improvement in tower construction, and has for its object to provide a simple but efficient construction of the character specified, wherein a common means is provided for connecting the sections of the legs and for connecting the cross pipes or rods thereto, the said connections providing also an anchorage for the diagonal braces.

In the drawings:

Figure 1 is a front view of a tower or derrick constructed in accordance with the invention, Fig. 2 is a vertical section of one of the legs at the connection of a cross bar, Fig. 3 is a top plan view of such connection, Fig. 4 is a perspective view of a connecting plate.

In the present embodiment of the invention the tower is composed of four legs or uprights which are suitably secured to a base 1. Each of the uprights 2 is composed of piping of suitable diameter and length, which is sectional as shown, the sections being connected by a joint of pipe of a diameter such that it may be swaged into the meeting ends of the pipe sections as shown in Fig. 2, and this joint is secured to the lowermost section by a transverse rivet 4. This rivet is headed outside the pipe section at each end of the rivet, as shown, and at the joint a connecting plate of sheet metal shown in Fig. 4 is bent around the adjacent end of the pipe sections. This plate which is formed into a cylinder 5 encircles the abutting end of the pipe sections at the joint, and the said cylinder has two radial extensions 6 and 7, the extension 6 being at the top of the cylinder, while the extension 7 is at the bottom.

Each of these extensions 6 and 7 has an angular portion or flange 8 at its free end, and each of these flanges has a circular opening 9 of a size to permit the passage of a cross pipe or girder 10.

Each of the extensions 6 and 7 is provided with a pair of key-hole shaped openings 11, and these openings are adapted to receive heads 12 on inclined or diagonal brace rods 13. Each of these brace rods has a turn buckle 14 interposed in the length thereof for permitting the brace to be tightened, and the lowermost cross pipes 10 are anchored to the base by similar rods 15, each of which engages an eye bolt 16 in the base. Turn buckles 17 are interposed in these braces 15, and the tops of the legs are connected by I bars 18 and 19.

While the improved connection is shown in connection with a tower, it is obvious that it might be used with equal facility in any skeleton structure, as for instance derricks, masts and the like.

I claim:

1. In a skeleton structure consisting of hollow uprights, a means for connecting and bracing the uprights, said means comprising sleeves embracing the adjacent ends of the sections, each sleeve having an extension at each end, said extensions being at approximately right angles with respect to each other each extension having means for engagement by a girder, and for engagement by inclined braces, the means for engagement by the girders being angular lugs at the ends of the extensions having openings through which the girders may extend, the means for engagement by the braces being key-hole slots in the extensions, girders for engaging the openings of the lugs, and inclined braces having heads for engaging the slots.

2. In a skeleton structure consisting of hollow uprights, a means for connecting and bracing the uprights, said means comprising sleeves embracing the adjacent ends of the sections, each sleeve having an extension at each end, said extensions being at approximately right angles with respect to each other each extension having means for engagement by a girder, and for engagement by inclined braces, the means for engagement by the girders being angular lugs at the ends of the extensions having openings through which the girders may extend, the means for engagement by the braces being key-hole slots in the extensions.

3. In a skeleton structure consisting of hollow uprights, a means for connecting and bracing the uprights, said means comprising sleeves embracing the adjacent ends of the sections, each sleeve having an extension at each end, said extensions being at approximately right angles with respect to each other each extension having means for engagement by a girder, and for engagement by inclined braces, the means for engagement by the girders being angular lugs at the ends of the extensions having openings through which the girders may extend.

J. BENJAMIN HEID.